United States Patent Office 3,186,391
Patented June 1, 1965

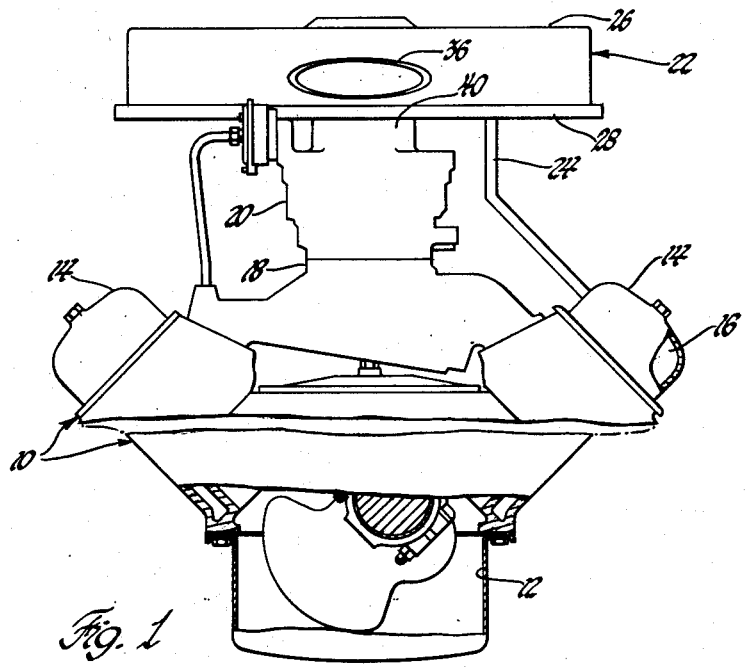
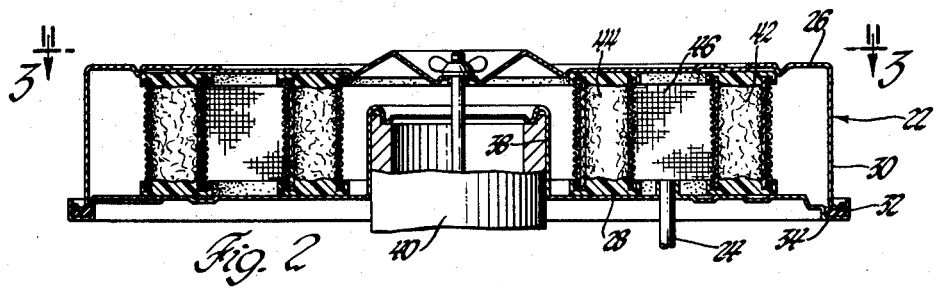
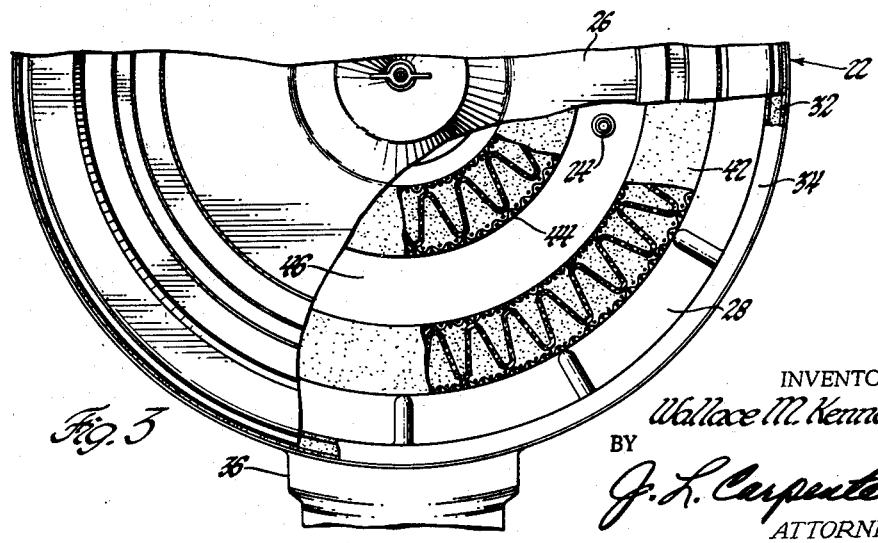

3,186,391
CRANKCASE VENTILATION
Wallace M. Kennedy, Bloomfield Hills, Mich., assignor to General Motors Corporation, Detroit, Mich., a corporation of Delaware
Filed Nov. 6, 1963, Ser. No. 321,935
14 Claims. (Cl. 123—119)

This invention relates to crankcase ventilation systems for internal combustion engines and more particularly to systems incorporating an improved air cleaner for receiving and treating vapors recirculated from the engine crankcase.

It is known to ventilate the crankcase of an internal combustion engine to remove crankcase vapors including blow-by gases which tend to accumulate in the crankcase portion of the engine. Furthermore, it has been found to be desirable, in order to reduce contamination of the atmosphere, to return crankcase vapors to the engine combustion fluid inlet to be recirculated to the cylinders to be burned. A number of devices have been proposed which communicate the engine crankcase with the intake manifold or cylinder inlet passage downstream of the carburetor. With all of these devices it is necessary to install a control valve to regulate the flow of crankcase vapors, since engine manifold vacuum is available in an inverse proportion to the creation of crankcase vapors due to the operation of the engine. Additionally, no provision is made in these devices for removing undesirable contaminants from the crankcase vapors before they are returned to the engine cylinders.

Other devices have been proposed in which the engine crankcase is communicated with some portion of the combustion fluid inlet upstream of the carburetor either upstream or downstream of the inlet air cleaner. Where the connection is downstream of the inlet air cleaner the contaminants present in the crankcase vapors tend to accumulate in the carburetor causing clogging of the ports and consequent malfunctioning. Where the communication is upstream of the inlet air filter there is no barrier between the passage communicating with the engine crankcase and the atmosphere and, therefore, upon stopping of the engine, residual crankcase vapors tend to rise by natural convection and escape from the crankcase into the atmosphere and, in the case of an automobile engine, into the engine hood and passenger compartment.

The present invention solves many of the problems found in prior devices by providing an inlet air cleaner having filter means including upstream and downstream portions in series and means communicating the engine crankcase with the portion of the air cleaner between the upstream and downstream portions.

It is an object of this invention to provide an improved crankcase ventilation system including communication of the engine crankcase with a portion of the air cleaner between upstream and downstream portions of the inlet air filter.

A further object of this invention is to utilize the reduced pressure formed in a portion of the air cleaner between a pair of inlet air filters to maintain a flow of crankcase vapors from the engine crankcase into the engine air inlet.

A still further object of the invention is to provide an improved crankcase ventilation system including filter means for removing contaminants from the crankcase vapors before conveying them to the engine air inlet in order to prevent contamination of the carburetor or other engine parts.

Yet another object of this invention is to provide a crankcase ventilation system having filter means between the atmosphere and the means in communication with the engine crankcase in order to restrict the emission of residual crankcase vapors to the atmosphere when the engine is stopped.

Still another object of this invention is to provide an improved air cleaner for use with an engine crankcase ventilating system including a pair of filter elements in series partially defining a flow chamber therebetween and means extending through a wall of said chamber adapted to permit the introduction thereinto of engine crankcase vapors.

Further objects of the invention will be apparent from the following description and drawings wherein like numerals refer to like parts:

FIGURE 1 is a partial end view of an internal combustion engine embodying this invention;

FIGURE 2 is a cross-sectional view of an engine air cleaner in accordance with this invention; and FIGURE 3 is a plan view partially broken away to show the interior of the engine air cleaner of FIGURE 2, taken generally along the plane indicated by the line 3—3.

Referring now to the drawing, an engine 10 includes a crankcase 12 and has rocker covers 14 partially defining rocker chambers 16 communicating with the crankcase 12. The engine further includes a combustion fluid inlet 18 having mounted thereon a carburetor 20 which carries an air cleaner 22. Conduit means 24 communicate the air cleaner 22 with a rocker chamber 16 of the engine, providing a convenient path of communication of the air cleaner with the engine crankcase. The communicating conduit 24 could equally well be connected directly with the crankcase 12 within the scope of this invention.

Referring now to FIGURES 2 and 3, air cleaner 22 includes parallel, generally circular, upper and lower walls 26 and 28, respectively, the upper wall 26 having a cylindrical peripheral portion 30 extending downwardly and engaging a resilient seal 32 disposed in a channel portion 34 formed around the periphery of the lower wall 28. An air inlet duct 36 extends outwardly from portion 30. An upwardly extending cylindrical portion 38 of the lower wall 28 terminates in a radially inturned flange and is sealingly engaged around an air inlet horn 40 extending upwardly from the carburetor 20. A pair of air filter elements 42 and 44 are concentrically disposed within air cleaner 22 so as to sealingly engage upper and lower walls 26 and 28 and define therewith an annular flow chamber 46. Conduit 24 extends through lower wall 28 into chamber 46 so as to communicate chamber 46 with the engine crankcase 12. It should be understood that a single filter element having upstream and downstream portions and provision for communication with the area therebetween could equally as well be utilized as the separate filter elements shown.

In operation, ambient air entering air cleaner 24 will experience a slight pressure reduction in passing through upstream filter element 42 thereby creating a slight depression in chamber 46 and causing a flow of crankcase vapors from crankcase 12 through chamber 16 and communicating conduit 24 into the air stream passing through chamber 46. Upon entering the inlet air stream the crankcase vapors will be carried therewith through downstream filter element 44, which will remove the majority of undesirable contaminants brought into the air stream by the crankcase vapors, and thenceforth through the carburetor 20 and engine combustion fluid inlet 18 to the cylinders for combustion.

It is apparent that the depression in chamber 46 will vary in direct relation to the flow of air through air cleaner 22, which flow will also bear a direct relationship to the delivery of blow-by gases to the crankcase. For this reason, the use of a separate flow control valve or other such device should not be necessary in most applications. If found desirable, however, any well known type of flow control arrangement, such as the disposition of a flow control valve in conduit means 24, could be utilized without reducing the other advantages or affecting the otherwise novel features of this invention.

The upstream filter element 42 is so constructed as to act as a barrier to restrict the escape to atmosphere of residual crankcase vapors present in the crankcase when the engine is stopped. Although many types of filter elements might satisfactorily accomplish this purpose, an impregnated paper type element of the type currently in common use in automotive vehicle engines is preferred due to the very small size of the holes in the surface. Presumably, any surface type filter relying for filtration on a plurality of sufficiently minute holes in the surface filtering material will be equally effective.

What is claimed is:

1. In a crankcase ventilating system for an internal combustion engine of the type having a combustion fluid inlet and an air cleaner communicating with said fluid inlet, the improvement comprising filter means in said air cleaner having upstream and downstream portions and means communicating the crankcase of said engine with a portion of said air cleaner between said upstream and downstream portions whereby, during operation, air entering said engine through said filter means will maintain a less than ambient pressure between said upstream and said downstream portions causing a flow of crankcase vapors from said crankcase to said filter means and through said downstream portion thereby to filter contaminants from said crankcase vapors before their delivery to said air inlet and whereby upon stopping said engine said upstream portion of said filter means provides a restriction to deter the escape through said air cleaner to atmosphere of residual crankcase vapors.

2. In a crankcase ventilating system for an internal combustion engine of the type having a combustion fluid inlet and an air cleaner communicating with said fluid inlet, the improvement comprising a pair of filter elements in series in said air cleaner partially defining a flow chamber therebetween and means communicating the engine crankcase with said flow chamber whereby, during operation, air entering said engine through said pair of filter elements will maintain a less than ambient pressure in said flow chamber causing a flow of crankcase vapors from said crankcase to said flow chamber and through one of said pair of filter elements thereby to filter contaminants from said crankcase vapors before their delivery to said air inlet and whereby upon stopping said engine the other of said pair of filter elements provides a restriction to deter the escape through said air cleaner to atmosphere of residual crankcase vapors.

3. The invention of claim 2 wherein said pair of filter elements comprise concentric annular rings of filter material sealingly disposed between parallel upper and lower walls of said air cleaner, said flow chamber having an annular shape and being defined by said filter elements and said upper and lower walls.

4. The invention of claim 3 wherein said communicating means includes a conduit extending between said annular flow chamber and a chamber in communication with the engine crankcase.

5. The invention of claim 4 wherein said conduit extends through said lower wall of said air cleaner.

6. In a crankcase ventilating system for an internal combustion engine of the type having a crankcase, a carburetor and an air cleaner communicating with said carburetor, the improvement comprising upper and lower walls in said air cleaner sealingly retaining therebetween a pair of concentrically disposed annular filter elements, said walls and said filter elements defining an annular flow chamber within said air cleaner and conduit means extending through said lower wall communicating said flow chamber with said crankcase.

7. In an internal combustion engine of the type having a crankcase, a combustion fluid inlet and an air cleaner communicating with said fluid inlet, the improvement comprising filter means in said air cleaner having upstream and downstream filtration portions partially defining a flow chamber therebetween, and means communicating said crankcase with said flow chamber.

8. A crankcase ventilation system comprising in combination an internal combustion engine having a crankcase, a combustion fluid inlet and an air cleaner communicating with said fluid inlet, a pair of filter elements in series in said air cleaner and partially defining a flow chamber therebetween, and means communicating the crankcase of said engine with said flow chamber whereby to define a closed fluid flow system for conveying engine blow-by gases from said engine crankcase to said carburetor.

9. An air cleaner for an internal combustion engine comprising a pair of filter elements in series partially defining a flow chamber therebetween and communicating means in a wall of said flow chamber adapted to permit the introduction of crankcase vapors into said flow chamber.

10. An air cleaner for an internal combustion engine comprising filter means having upstream and downstream filtration portions partially defining a flow chamber therebetween and communicating means through a wall of said flow chamber adapted to permit the introduction of engine crankcase vapors into said flow chamber.

11. The device of claim 10 wherein said upstream portion of said filter means comprises a surface type filter material having a plurality of minute holes for the passage of air therethrough.

12. An air cleaner for an internal combustion engine comprising in combination upper and lower wall means, a pair of concentrically disposed generally annular filter elements sealingly held between said wall means, said wall means and said filter elements defining an annular flow chamber therebetween and means through said lower wall means adapted to permit the introduction of crankcase vapors into said flow chamber.

13. The device of claim 12 wherein the outer of said pair of concentrically disposed filter elements is so constructed as to provide a restriction to deter the escape of residual crankcase vapors therethrough.

14. The device of claim 12 wherein the outer of said pair of concentrically disposed filter elements comprises a surface type filter including a porous paper filter material having a plurality of minute holes for the passage of air therethrough.

References Cited by the Examiner

UNITED STATES PATENTS

| | | |
|---|---|---|
| 1,458,657 | 6/23 | Rose. |
| 2,771,153 | 11/56 | Hennig _____ 55—484 XR |
| 3,063,440 | 11/62 | Tuzzaline _____ 123—119 XR |
| 3,111,120 | 11/63 | Cornell _____ 123—119 |

RICHARD B. WILKINSON, *Primary Examiner.*

KARL J. ALBRECHT, *Examiner.*